(12) United States Patent
Letz et al.

(10) Patent No.: US 8,141,387 B2
(45) Date of Patent: Mar. 27, 2012

(54) PROCESS OF PRODUCING A GLASS-CERAMIC, THE GLASS-CERAMIC MADE THERBY AND ITS USES

(75) Inventors: Martin Letz, Mainz (DE); Mark J. Davis, Summit, PA (US); Bernd Ruedinger, Woerrstadt (DE); Bernd Hoppe, Ingelheim (DE); Bianca Schreder, Sulibach (DE); Maria-Louisa Aigner, Frankfurt a. Main (DE); Daniela Seiler, Alzey (DE)

(73) Assignee: Schott AG, Mainz (DE)

( * ) Notice: Subject to any disclaimer, the term of this patent is extended or adjusted under 35 U.S.C. 154(b) by 455 days.

(21) Appl. No.: 12/392,408

(22) Filed: Feb. 25, 2009

(65) Prior Publication Data
US 2009/0215605 A1 Aug. 27, 2009

(30) Foreign Application Priority Data

Feb. 26, 2008 (DE) .................. 10 2008 011 206

(51) Int. Cl.
| | |
|---|---|
| C03B 32/02 | (2006.01) |
| C03B 27/012 | (2006.01) |
| C03C 1/00 | (2006.01) |
| C03C 10/00 | (2006.01) |
| C03C 10/02 | (2006.01) |
| C01F 11/02 | (2006.01) |
| C01F 5/02 | (2006.01) |
| C01F 5/14 | (2006.01) |
| C01G 23/00 | (2006.01) |

(52) U.S. Cl. ............. 65/33.2; 65/33.1; 65/33.9; 501/10; 423/594.16; 423/598; 423/635

(58) Field of Classification Search .................... 501/10, 501/4–9; 423/598, 594.16, 635, 636–640; 65/33.1, 33.2, 33.9
See application file for complete search history.

(56) References Cited

U.S. PATENT DOCUMENTS
3,195,030 A * 7/1965 Herczog et al. ............... 361/320
(Continued)

FOREIGN PATENT DOCUMENTS
DE        1 928 090        12/1969
(Continued)

OTHER PUBLICATIONS

Andrew Herczog: "Microcrystalline BaTiO3 by Crystallization From Glass." Journal of The American Ceramic Society, Mar. 21, 1964, vol. 47, No. 3, Corning Glass Works, Corning, New York.

(Continued)

*Primary Examiner* — David M. Brunsman
*Assistant Examiner* — Kevin Johnson
(74) *Attorney, Agent, or Firm* — Michael J. Striker

(57) ABSTRACT

The process of making the glass-ceramic includes ceramicizing a starting glass at a heating or cooling rate during the ceramicization of at least 10 K/min, so that the glass-ceramic contains at least 50% by volume of ferroelectric crystallites with a maximum diameter of from 20 to 100 nm and not more than 10% by volume of nonferroelectric crystallitesis. The glass ceramic produced by the process contains no pores or not more than 0.01% by volume of the pores and a value of $e' \cdot V^2_{max}$ of the glass-ceramic is at least 20 $(MV/cm)^2$, wherein $e'$ is the dielectric constant at 1 kHz and $V_{max}$ is the breakdown voltage per unit thickness. The ferroelectric crystallites preferably have a perovskite structure and are composed of substantially pure or doped $BaTiO_3$ and/or $BaTi_2O_5$.

10 Claims, 2 Drawing Sheets

U.S. PATENT DOCUMENTS

| | | | |
|---|---|---|---|
| 3,615,757 A | | 10/1971 | Herczog |
| 4,027,209 A | * | 5/1977 | Maher .................... 361/321.4 |
| 4,042,362 A | * | 8/1977 | MacDowell et al. .......... 65/33.1 |
| 6,843,073 B2 | | 1/2005 | Fotheringham et al. |
| 2002/0062662 A1 | | 5/2002 | Fotheringham et al. |

FOREIGN PATENT DOCUMENTS

| | | |
|---|---|---|
| DE | 100 60 987 | 4/2002 |
| EP | 0 378 989 | 7/1990 |

OTHER PUBLICATIONS

"Glass Ceramics Containing Ferroelectric Phases." Bull. Mater. Sci., vol. 8, No. 5, Dec. 1986, p. 557-565.

McCauley et al: "Intrinsic Size Effects in a Barium Titanate Glass-Ceramic." Materials Research Laboratory, Pennsylvania State University, University Park, Pennsylvania, 16802.

E.P. Gorzkowski et al: "Glass-Ceramic of Barium Strontium Titanate for High Energy Density Capacitors." J. Electrocerm. 2007, vol. 18, p. 269-276.

* cited by examiner

PROCESS OF PRODUCING A GLASS-CERAMIC, THE GLASS-CERAMIC MADE THERBY AND ITS USES

CROSS-REFERENCE

The invention claimed and described herein below is also described in German Patent Application 10 2008 011 206.2, filed on Feb. 26, 2008. The aforesaid German Patent Application provides the basis for a claim of priority of invention for the invention described and claimed herein below under 35 U.S.C. 119 (a) to (d).

BACKGROUND OF THE INVENTION

1. The Field of the Invention

The invention relates to a process of producing a glass-ceramic, the glass-ceramic made by the process, and the uses of the glass-ceramic.

2. The Description of the Related Art

Glass-ceramics containing microcrystalline $BaTiO_3$ are described in the article by A. Herczog, "Microcrystalline $BaTiO_3$, by Crystallization from Glass", Journal of the American Ceramic Society, Vol. 47, No. 3, March 1964, pp. 107 to 115. According to the article, it is known that starting glasses can be converted into glass-ceramics by means of controlled heating, with the glass-ceramics containing not only $BaTiO_3$ crystallites but also $BaAl_2Si_2O_8$ crystallites. The crystallites have an average particle size in the range from 0.2 to 0.8 μm. The glass-ceramics have dielectric constants e' of not more than 1200. Furthermore, glass-ceramic articles having a high dielectric constant are known from the document DE 192 80 90.

In the article "Glass ceramics containing ferroelectric phases", Bull. Mater. Sci., Vol. 8, No. 5, December 1986, pages 557 to 565, O. Parkash, et al, describe glass-ceramics, which contain $BaTiO_3$ crystallites and have a maximum dielectric constant at crystallite sizes in the submicron range from 0.2 to 0.8 μm.

Sintered glass-ceramics which have a high dielectric constant and comprise small, conductive grains based on $BaTiO_3$ and/or $SrTiO_3$ in the size range from about 0.5 μm to 10.0 μm surrounded by a thin, microcrystalline, insulating barrier layer having a thickness of from about 0.01 μm to 0.1 μm at the grain boundary are known from EP 0 378 989 A1.

Intrinsic size effects in $BaTiO_3$ glass-ceramics are described in the article by D. McCauley et al., J. Am. Ceram. Soc., Vol. 81, No. 4, 1998, pp. 979 to 987.

Glass-ceramics based on $Ba/SrTiO_3$ for capacitors having high energy densities are described in the article by E. P. Gorzkowski, et al, Glass-ceramics of barium strontium titanate for high energy density capacitors, J. Electroceram. 2007, Vol. 18, pp. 269 to 276.

SUMMARY OF THE INVENTION

Proceeding from the aforesaid prior art, it is an object of the invention to provide a process of for producing glass-ceramics, which have predeterminable and adjustable crystal sizes, predeterminable and adjustable phase proportions, and phase compositions of the crystal phases, and which are suitable, in particular, for use in capacitors or high-frequency filters.

According to the invention, this object is achieved by the process claimed in the process claims appended herein below.

The process of producing a glass-ceramic according to the invention comprises the steps of producing a starting glass and ceramicizing the starting glass at a heating or cooling rate of at least 10 K/min during the ceramicization to produce the glass-ceramic so that ferroelectric crystallites having a maximum diameter of from 20 to 100 nm are obtained as the predominant crystal phase of the glass-ceramic, the proportion of the ferroelectric crystallites in the glass-ceramic is at least 50% by volume while the proportion of the nonferroelectric crystallites is not more than 10% by volume, the glass-ceramic has no pores or does not have more than 0.01% by volume of pores, and a value of $e' \cdot V^2_{max}$ of the glass-ceramic is at least 20 $(MV/cm)^2$, wherein e' is the dielectric constant of the glass-ceramic at 1 kHz and $V_{max}$ is the breakdown voltage per unit thickness of the glass-ceramic.

Preference is given to ferroelectric crystallites having a perovskite structure or ferroelectric crystallites of essentially pure or doped $BaTiO_3$ and/or of pure or doped $BaTi_2O_5$ obtained from suitable starting glasses by means of the process.

In preferred embodiments of the invention the proportion of ferroelectric crystallites in the glass-ceramic is greater than 60% by volume, particular greater than 70% by volume and particularly preferably greater than 80% by volume. It has been found that, in particular, the dielectric constant e' of the glass-ceramic can be increased by increasing the proportion of the ferroelectric crystallites in the glass-ceramic. The glass-ceramics preferably have a dielectric constant e' of >2000, particularly greater than 3000, and particularly preferably >5000 or even >10 000.

The starting glasses are melted from the raw materials customary in glass production under customary conditions, refined, homogenized and conditioned. The hot shaping of the starting glasses can be effected, for example, by means of rolling, drawing or floating. Furthermore, the starting glasses can also be mechanically worked, e.g. ground or polished, before ceramicization.

In the ceramicization, i.e. the conversion of the starting glasses into corresponding glass-ceramics, heating rates of greater than 10 K/min, in particular greater than 15 K/min and particularly preferably greater than 20 K/min, for example by heating by means of infrared radiation, in particular short-wavelength infrared radiation having a color temperature of greater than 1500° C., preferably greater than 2000° C., and particularly preferably greater than 2400° C., are used. An apparatus or a process which makes such high heating rates possible is known, for example, from DE 100 60 987 A1.

These high heating rates during the ceramicing, in particular, make it possible to obtain the desired crystal phase, i.e. ferroelectric crystallites having a maximum diameter of from 20 to 100 nm and a proportion in the glass-ceramic of >50% by volume, in a targeted manner and thus to influence the properties of the resulting glass-ceramic. If, for example, the heating rate is less than 10 K/min, not only the essentially desired ferroelectric crystal phase but also increasing amounts of nonferroelectric crystal phases, in particular in a proportion of >10% by volume in the glass-ceramic, are obtained.

According to the invention, the glass-ceramics are used as constituents of a capacitor, a high-frequency filter, in particular an adjustable high-frequency filter, a microelectronic component, e.g. a DRAM chip, or a permanent data storage device (Permanent Memory Device).

When the glass-ceramic according to the invention is used as a constituent of a capacitor, it is in particular the dielectric of a capacitor. Particularly in the case of high-energy capacitors for voltages above 1 kV/mm, the dielectric of the capacitor is composed of a glass-ceramic according to the invention.

A capacitor preferably contains a glass-ceramic according to the invention having ferroelectric crystallites such as $BaTiO_3$ and/or nonferroelectric crystallites, such as $SrTiO_3$.

The glass-ceramic can, according to the invention, be optimized for the temperature range of the electronic use of the capacitor, in particular via its composition, the crystallite proportion and size and the ceramicization of the glass-ceramic. The capacitors thus meet the temperature-dependence requirements of the EIE Standard Z5U or X8R.

The capacitors are in turn used in AC transformers, e.g. in wind power plants, solar energy plants, in energy management, and for example of hybrid engines, in particular vehicles.

The glass-ceramic preferably has a thickness in the range $20\,\mu m < h < 10$ mm, in particular $50\,\mu m < h < 5$ mm, as constituent of a capacitor.

The glass-ceramic as a constituent of a capacitor has structured contacts at a spacing of, for example, $50\,nm < d < 100\,\mu m$. Such structured contacts can, for example, be introduced by wet-chemical etching and/or by laser working and/or by means of wafer saws. The glass-ceramic typically has a thickness h of from $50\,\mu m$ to 5 mm. The spacing d is the distance between the upper and lower contacts which are embedded in the glass-ceramic. The spacing d can be much smaller than the thickness h, which leads to higher capacitances of the capacitor.

A glass-ceramic according to the invention having piezoelectric properties can also, appropriately poled, be used as a sensor, an actuator, or a constituent of a sensor or actuator.

A thermal switch or a thermistor can likewise contain a glass-ceramic according to the invention.

The glass-ceramics according to the invention display excellent temperature dependencies of the dielectric constant e'; in particular, the temperature dependence of e' is very small. Furthermore, the glass-ceramic of the invention has a high breakdown voltage per unit thickness, $V_{max}$. The breakdown voltage per unit thickness determines the voltage necessary to allow current to flow through the glass-ceramic of a particular thickness; electric breakdown or voltage breakdown occurs when the voltage is above this value.

An important parameter of the dielectric in capacitors is its breakdown voltage, i.e. the voltage above which the dielectric (in this case the glass-ceramic) loses its insulating properties and conduction between the outer layers of the capacitor occurs.

Ferroelectricity occurs only in crystallites whose crystalline symmetry allows a polar axis. This results in spontaneous polarization due to shifting of the differently charged ions in the crystal lattice. However, unlike piezoelectric and pyroelectric materials, the electric polarization in ferrolectrics can be reversed by application of a voltage. Ferroelectric crystallites are always also pyroelectric and thus also piezoelectric. Thus, the polarization of ferroelectrics disappears at high temperatures (the ferroelectric Curie temperature) and the material is then paraelectric. Above this temperature, the dielectric constant e' obeys the Curie-Weiss law in a manner analogous to the ferromagnetic susceptibility $\chi$. When the material is cooled to a temperature below this temperature, a phase transition, which generally coincides with a structural change (reduction in the crystal symmetry) occurs, and the material becomes ferroelectric again. The polarization can be reversed by application of an external electric field and follows a hysteresis curve.

Ferroelectric crystallites form domains, i.e. regions having the same polarization direction. The polarization direction changes from domain to domain over a few atom layers in which the polarization disappears. The ferroelectric domain walls are only a few nanometers thick. Thus, ferroelectrics have a high dielectric constant in the vicinity of the phase transition. The dielectric constant e' is then in a range from 100 to 100 000, which is why they are particularly suitable as materials for capacitors.

Ferroelectrics generally have a dielectric constant e' with strong temperature dependence, which can cause from ten- to twenty-fold capacitance changes in the temperature range from 4 K to 300 K.

Ferroelectric dielectrics in ceramic form are used for ceramic capacitors having high volume capacitances because of their very high dielectric constants and are increasingly replacing electrolytic capacitors. Compared to the latter, they have small equivalent series resistances and inductances, but have the disadvantages of high temperature dependence, high tolerances and high dielectric loss factors. It has been found that these disadvantages can be greatly reduced by use of a glass-ceramic according to the invention.

The best known ferroelectrics are crystallites having a perovskite structure such as: barium titanate $BaTiO_3$ or lead zirconate-titanate $Pb(Zr_xTi_{1-x})O_3$. Furthermore, the following crystallites are also ferroelectric: strontium-bismuth tantalate $SrBi_2Ta_2O_9$, bismuth titanate $Bi_4Ti_3O_{12}$, bismuth lanthanum titanate $Bi_{4-x}La_xTi_3O_{12}$, bismuth titanate-niobate $Bi_3TiNbO_9$, strontium titanate $SrTiO_3$, barium-strontium titanate $Ba_xSr_{1-x}TiO_3$, sodium nitrite $NaNO_2$, barium dititanium pentaoxide $BaTi_2O_5$.

The glass-ceramic of the invention has a high chemical resistance and in electronic applications displays no ageing or fatigue phenomenon, even at a high power density.

The glass-ceramics produced from suitable starting glasses by means of ceramicization (heat/time treatment) are essentially pore-free, i.e. they have no pores or not more than 0.01% by volume of pores, with the crystalline phase being surrounded by a vitreous phase. It has been found that the properties of the glass-ceramic, in particular the voltage breakdown resistance, depend significantly on a low pore count, which compared to ceramic materials or sintered glass-ceramics (which both always have a residual content of pores) leads to the excellent properties mentioned.

BRIEF DESCRIPTION OF THE DRAWING

The objects, features and advantages of the invention will now be illustrated in more detail with the aid of the following description of the preferred embodiments and examples, with reference to the accompanying figures in which.

EXAMPLES

Figure 1:
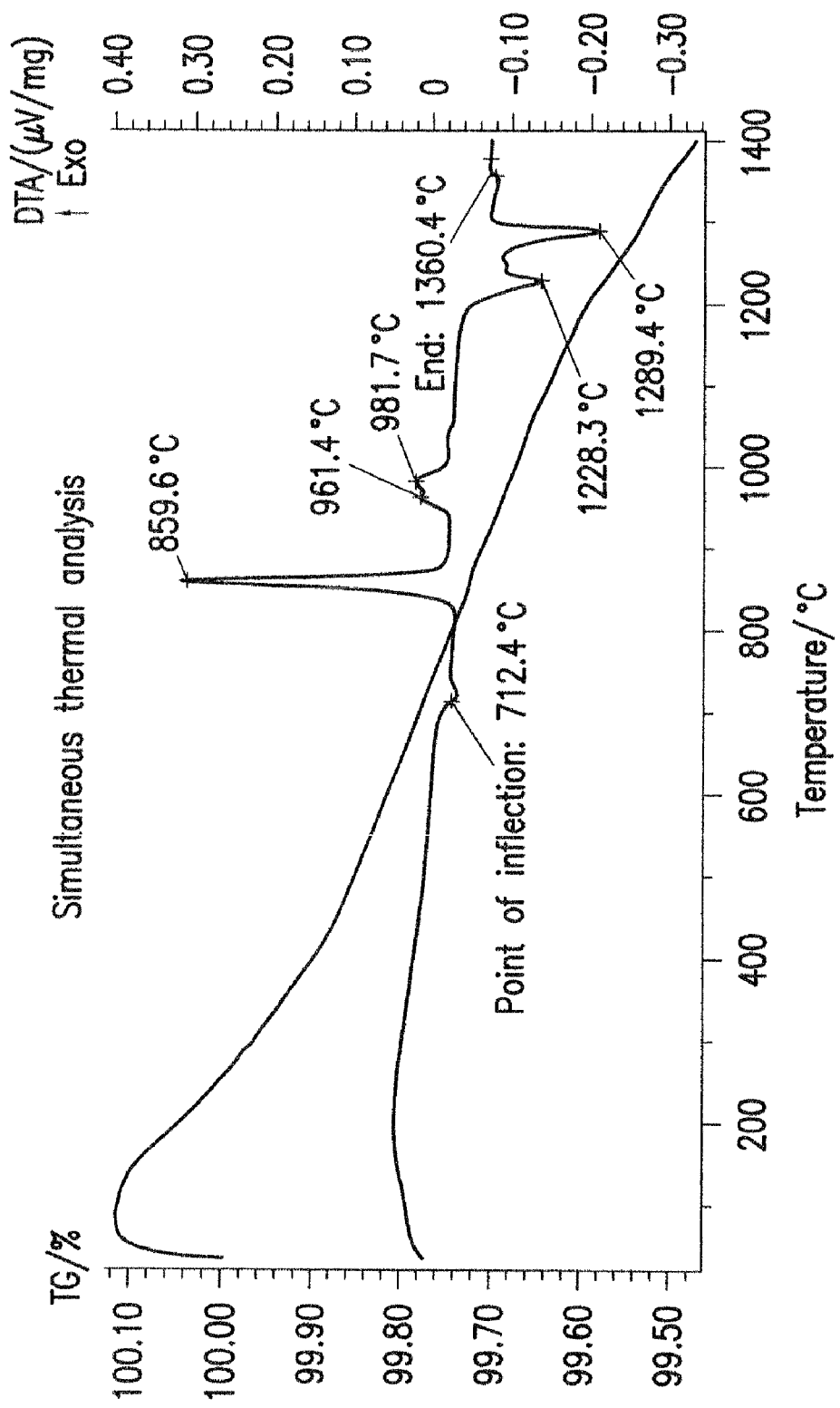
FIG. 1 shows the differential thermal analysis (DTA) of an exemplary starting glass for the process of making a glass-ceramic according to the present invention.

Table I shows the glass compositions of the starting glasses. The starting glasses have the following numbers (VSM): 31229, 30209, 31211, 30211, 30963, 31210, 30210, B, C.

Which dielectric constant e' was measured for which ceramicized starting glass, i.e. for which resulting glass-ceramic (if appropriate with indication of the ceramicization number according to Table II) is indicated below:

30963: e' (at 1 kHz)=350 at DE No. 1
31210: e' (at 1 kHz)=17 at DE No. 3, e' (at 1 kHz)=38 at DE No. 11
31229: e' (at 1 kHz)=1100
31229: e' (at 1 kHz)=10 000

TABLE I

GLASS COMPOSITIONS, IN EACH CASE IN % BY WEIGHT AND MOL %

| | Number | | | | | |
|---|---|---|---|---|---|---|
| | 31229/30209 | | 31211/30211 | | 30963 | |
| | mol % | % by weight | Mol % | % by weight | mol % | % by weight |
| SiO$_2$ | 14.20 | 7.7457024 | 18.10 | 10.210109 | 18.10 | 10.319771 |
| Al$_2$O$_3$ | 7.10 | 6.5718455 | 7.10 | 6.7962085 | 3.60 | 3.4829764 |
| B$_2$O$_3$ | 0.00 | 0 | 0.00 | 0 | 3.50 | 2.3121727 |
| BaO | 42.90 | 59.715022 | 39.00 | 56.139723 | 39.00 | 56.742694 |
| TiO$_2$ | 35.80 | 25.96743 | 35.80 | 26.853959 | 35.80 | 27.142385 |
| SrO | 0.00 | 0 | 0.00 | 0 | 0.00 | 0 |
| ZrO$_2$ | 0.00 | 0 | 0.00 | 0 | 0.00 | 0 |
| Total | 100.00 | 100 | 100.00 | 100 | 100.00 | 100 |

| | Number | | | | | |
|---|---|---|---|---|---|---|
| | 31210/30210 | | B → mark | | C → mark | |
| | Mol % | % by weight | Mol % | % by weight | mol % | % by weight |
| SiO$_2$ | 24.00 | 14.24985 | 14.20 | 8.2233064 | 14.20 | 9.790886 |
| Al$_2$O$_3$ | 3.00 | 3.0225733 | 7.10 | 6.9770689 | 7.10 | 8.3070827 |
| B$_2$O$_3$ | 3.00 | 2.0638638 | 0.00 | 0 | 0.00 | 0 |
| BaO | 35.00 | 53.029915 | 30.03 | 44.377957 | 0.00 | 0 |
| TiO$_2$ | 35.00 | 27.633798 | 35.80 | 27.568595 | 42.90 | 39.333666 |
| SrO | 0.00 | 0 | 12.87 | 12.853073 | 35.80 | 42.568365 |
| ZrO$_2$ | 0.00 | 0 | 0.00 | 0 | 0.00 | 0 |
| Total | 100.00 | 100 | 100.00 | 100 | 100.00 | 100 |

The heating rates and hold times used for the ceramicization of the respective samples are shown in Table II. The ceramicization cycles are denoted by DE1 to DE12 (type, No.). VSM denotes the sample number of the starting glasses, R is the heating or cooling ramp (rate), Z is the respective target temperature, H is the hold time, FCL is the respective furnace characteristic line.

TABLE II

SEQUENCE EXAMPLES (R = RAMP, Z = TARGET, H = HOLD; FCL = COOLING AT FURNACE CHARACTERISTIC LINE FOR H = TIME, E = REMOVAL FROM FURNACE)

| Type | No | VSM | Type of specimen L × b × h mm | R1 K/min | Z1 °C. | H1 min | R2 K/min | Z2 °C. | H2 min | R3 K/min | Z3 °C. | H3 min | R4 K/min | Z4 °C. | H4 min | R5 K/min | Z5 °C. | H5 min |
|---|---|---|---|---|---|---|---|---|---|---|---|---|---|---|---|---|---|---|
| DE | 1 | 30963 | rough as sawn 30 × 25 × 4 | 200 | 700 | 0 | 100 | 800 | 0 | 50 | 850 | 6 | 10 | 885 | 10 | FCL | 500 | E |
| DE | 2 | 31210 | rough as sawn 30 × 30 × 3 | 300 | 700 | 0 | 400 | 800 | 0 | 0 | 850 | 10 | FCL | 500 | E | | | |
| DE | 3 | 31210 | rough as sawn 30 × 30 × 3 | 400 | 750 | 15 s | 400 | 800 | 0 | 0 | 850 | 20 | FCL | 500 | E | | | |
| DE | 4 | 31210 | rough as sawn 30 × 30 × 3 | 400 | 750 | 7 s | 400 | 800 | 0 | 100 | 850 | 20 | FCL | 500 | E | | | |
| DE | 5 | 31210 | rough as sawn 30 × 30 × 3 | 400 | 750 | 9 s | 400 | 800 | 0 | 100 | 850 | 20 | FCL | 500 | E | | | |
| DE | 6 | 31210 | rough as sawn 30 × 30 × 3 | 400 | 720 | 9 s | 0 | 750 | 0 | 400 | 800 | 10 s | 100 | 850 | 20 | FCL | 500 | E |
| DE | 7 | 31210 | rough as sawn 30 × 30 × 3 | 400 | 720 | 9 s | 0 | 750 | 0 | 400 | 800 | 10 s | 100 | 850 | 20 | FCL | 500 | E |
| DE | 8 | 31210 | rough as sawn 30 × 30 × 3 | 400 | 720 | 9 s | 0 | 750 | 0 | 400 | 800 | 10 s | 100 | 850 | 10 | FCL | 500 | E |

TABLE II-continued

SEQUENCE EXAMPLES (R = RAMP, Z = TARGET, H = HOLD; FCL = COOLING AT FURNACE CHARACTERISTIC LINE FOR H = TIME, E = REMOVAL FROM FURNACE)

| Type | No | VSM | Type of specimen L × b × h mm | R1 K/min | Z1 °C. | H1 min | R2 K/min | Z2 °C. | H2 min | R3 K/min | Z3 °C. | H3 min | R4 K/min | Z4 °C. | H4 min | R5 K/min | Z5 °C. | H5 min |
|---|---|---|---|---|---|---|---|---|---|---|---|---|---|---|---|---|---|---|
| DE | 9 | 31210 | rough as sawn 30 × 30 × 3 | 400 | 700 | 0 | 300 | 750 | 0 | 150 | 800 | 0 | 50 | 860 | 10 | FCL | 500 | E |
| DE | 10 | 31210 | rough as sawn 30 × 30 × 3 | 400 | 700 | 0 | 300 | 750 | 0 | 150 | 800 | 0 | 50 | 870 | 10 | FCL | 500 | E |
| DE | 11 | 31210 | rough as sawn 30 × 30 × 3 | 400 | 700 | 0 | 300 | 750 | 0 | 150 | 800 | 0 | 50 | 875 | 15 | FCL | 500 | E |
| DE | 12 | 31210 | rough as sawn 30 × 30 × 3 | 400 | 720 | 7 s | 200 | 800 | 0 | 50 | 860 | 10 s | 10 | 875 | 15 | FCL | 500 | E |

The ferroelectric crystallites are preferably crystallites of the type $Ba_{1-x}Z1_xTi_{1-y}Z2_yO_3$, where Z1=Sr, Ce, Ca, Pb, etc. and Z2=Zr, Hf, etc. on the Ba or Ti sites of the perovskite crystal lattice. To obtain the perovskite phases, it is necessary to adhere to the temperature/time treatment of the ceramicization. To be able to control the temperature precisely, the latent heat of the crystal phase transformation has to be taken into account. This can be determined as shown in FIG. 1 for the thermal analysis (DTA) of the starting glass number 31211. The exothermic crystallization peaks at 860° C., 960° C. and 980° C. can be seen clearly. The transformation temperature of the starting glass is about 712° C. The ceramicization succeeds best by means of infrared heating of the starting glass and temperature control and regulation via a pyrometer.

The ferroelectric crystallites of the glass-ceramic of the invention preferably have a maximum diameter in the order of the size of the ferroelectric domains, in particular in the range from 20 to 100 nm, preferably from 20 to 90 nm and particularly preferably from 20 to 80 nm.

If the ferroelectric crystallites consist of $BaTiO_3$, Ba can preferably be partly replaced (doped) by Sr, Ca, Pb and/or Ti can preferably be partly replaced (doped) by Zr, Hf, Y. However, the crystallites can also contain a superstoichiometric amount of Ba and/or a substoichiometric amount of Ti.

The energy E stored in a capacitor is proportional to the square of the applied voltage V times the dielectric constant e', i.e. $E \sim e' \cdot V^2$. It is therefore necessary, particularly for high-energy applications, to keep the breakdown voltage of the capacitor very high together with a high dielectric constant e'.

According to the invention, the value of $e' \cdot V^2_{max}$ is >20 $(MV/cm)^2$, with the dielectric constant e' preferably being greater than 3000, in particular greater than 5000 and particularly preferably greater than 10 000.

Furthermore, it is important for such applications that no fatigue of the material occurs, i.e. e' is not reduced over the course of many operating cycles, or voltage breakdown occurs.

The inventive glass-ceramic ceramicized from a starting glass is outstandingly suitable as constituent, in particular dielectric, of a capacitor.

Figure 2:
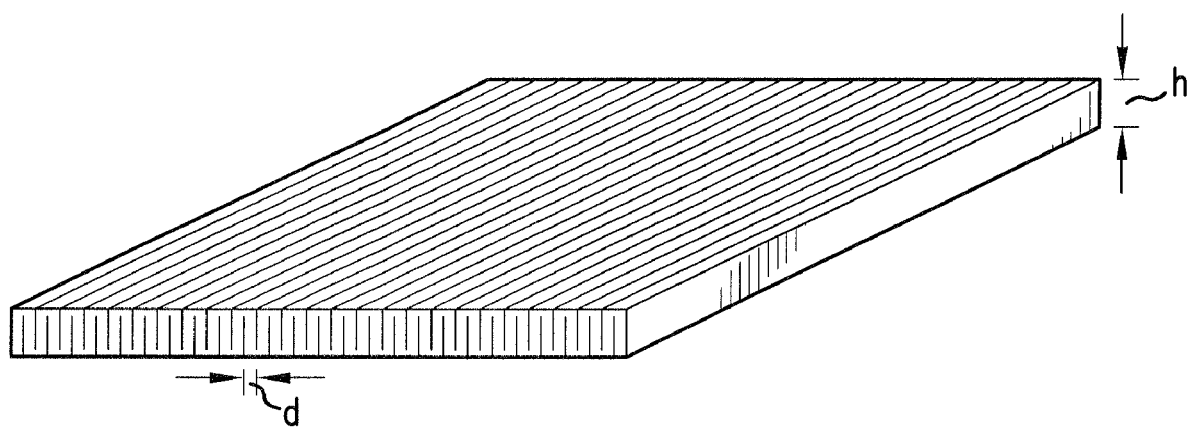
FIG. 2 is a perspective view of a capacitor comprising a glass-ceramic according to the present invention showing the spacing of the contacts.

FIG. 2 shows an example of the glass-ceramic as a constituent of a capacitor according to the invention, which is made by the process of the present invention.

The glass-ceramic shown in FIG. 2 preferably has a thickness in a range of 20 μm<h<10 mm, in particular 50 μm<h<5 mm and has structured contacts at a spacing of, for example, 50 nm<d<100 μm. Such contact structures can, for example, be introduced by wet-chemical etching and/or by laser working and/or by means of wafer saws. The spacing d is the distance between the upper and lower contacts which are embedded in the glass-ceramic. The spacing d can be much smaller than the thickness h, which leads to higher capacitances of the capacitor.

While the invention has been illustrated and described as embodied in a process of producing a glass-ceramic, a glass-ceramic made by the process, and a capacitor or other electronic devices using the glass-ceramic, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A process for producing a glass-ceramic, said glass-ceramic comprising not more than 10% by volume of non-ferroelectric crystallites and at least 50% by volume of ferroelectric crystallites, said ferroelectric crystallites having a maximum diameter of 20 to 100 nm, wherein said glass-ceramic has not more than 0.01% by volume of pores and $e' \cdot V^2_{max}$ of said glass-ceramic has a value of at least 20 $(MV/cm)^2$, wherein e' is a dielectric constant of the glass-ceramic at 1 kHz and $V_{max}$ is a breakdown voltage per unit thickness of the glass-ceramic, said process comprising the steps of:
 a) producing a starting glass;
 b) ceramicizing the starting glass at a heating rate of at least 10 K/min during the ceramicizing to form the glass-ceramic; and
 c) heating at said heating rate of said at least 10 K/min by means of infrared radiation at a color temperature of greater than 1500° C. during the ceramicizing;
 whereby said glass-ceramic is obtained with not more than 10% by volume of said non-ferroelectric crystallites and at least 50% by volume of said ferroelectric crystallites having said maximum diameter of 20 to 100 nm and said glass-ceramic has not more than 0.01% by volume of said pores and has said value of said $e' \cdot V^2_{max}$ of said glass-ceramic.

2. The process according to claim 1, wherein said heating rate is at least 20 K/min and said color temperature is greater than 2000° C.

3. The process according to claim 1, wherein prior to said ceramicizing the starting glass reaches room temperature.

4. The process according to claim 3, wherein prior to said ceramicizing the starting glass is mechanically worked.

5. The process according to claim 1, wherein said starting glass has a composition comprising $SiO_2$, BaO, and $TiO_2$.

6. The process according to claim 1, wherein said ferroelectric crystallites are composed of essentially pure or doped $BaTiO_3$ and/or pure or doped $BaTi_2O_5$ and said ferroelectric crystallites have a perovskite structure.

7. The process according to claim 1, wherein said proportion of said ferroelectric crystallites in said glass-ceramic is greater than 60% by volume.

8. The process according to claim 1, wherein said proportion of said ferroelectric crystallites in said glass-ceramic is greater than 70% by volume.

9. The process according to claim 1, wherein said proportion of said ferroelectric crystallites in said glass-ceramic is greater than 80% by volume.

10. The process according to claim 1, wherein said dielectric constant of the glass-ceramic is greater than 3000.

\* \* \* \* \*